US009495639B2

(12) United States Patent
Lamanna et al.

(10) Patent No.: US 9,495,639 B2
(45) Date of Patent: *Nov. 15, 2016

(54) DETERMINING DOCUMENT CLASSIFICATION PROBABILISTICALLY THROUGH CLASSIFICATION RULE ANALYSIS

(71) Applicant: Microsoft Technology Licensing, LLC, Redmond, WA (US)

(72) Inventors: Charles Lamanna, Bellevue, WA (US); Mauktik Gandhi, Redmond, WA (US); Andrey Shur, Redmond, WA (US); Abhijat Kanade, Redmond, WA (US); Jeffrey Brown, Redmond, WA (US); Robledo Pontes-Filho, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/631,430

(22) Filed: Feb. 25, 2015

(65) Prior Publication Data

US 2015/0170036 A1 Jun. 18, 2015

Related U.S. Application Data

(63) Continuation of application No. 13/527,267, filed on Jun. 19, 2012, now Pat. No. 8,972,328.

(51) Int. Cl.
| | |
|---|---|
| G06F 17/00 | (2006.01) |
| G06N 5/02 | (2006.01) |
| G06N 5/04 | (2006.01) |
| G06F 17/30 | (2006.01) |
| G06N 7/00 | (2006.01) |

(52) U.S. Cl.
CPC ......... *G06N 5/027* (2013.01); *G06F 17/30011* (2013.01); *G06F 17/30707* (2013.01); *G06N 5/047* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 6,092,059 A | 7/2000 | Straforini et al. | |
| 7,197,497 B2 | 3/2007 | Cossock | |
| 7,296,020 B2 | 11/2007 | Gerstl et al. | |
| 7,496,567 B1 * | 2/2009 | Steichen | G06F 17/30707 707/999.003 |
| 7,546,294 B2 | 6/2009 | Hullender et al. | |

(Continued)

OTHER PUBLICATIONS

Elkan, et al., "Learning Classifiers from Only Positive and Unlabeled Data", Retrieved at <<http://users.csc.tntech.edu/~weberle/Fall2008/CSC6910/Papers/posonly.pdf>>, KDD, Aug. 24-27, 2008, pp. 08.

(Continued)

*Primary Examiner* — Luis Sitiriche
(74) *Attorney, Agent, or Firm* — Anand Gupta; Tom Wong; Micky Minhas

(57) ABSTRACT

A classification application identifies patterns and evidences within representative documents. The application constructs a classification rule according to an entity and an affinity determined from the patterns and evidences. The application processes the representative documents with the classification rule to evaluate whether the rules meet acceptance requirements. Subsequent to a successful evaluation, the application identifies confidence levels for patterns and evidences within other documents.

19 Claims, 9 Drawing Sheets

(56) References Cited

U.S. PATENT DOCUMENTS

| | | |
|---|---|---|
| 7,593,934 B2 | 9/2009 | Li et al. |
| 7,788,292 B2 | 8/2010 | Kolcz et al. |
| 8,140,515 B2 * | 3/2012 | Pradhan ............ G06F 17/30699 707/711 |
| 8,244,724 B2 | 8/2012 | Chen et al. |
| 8,561,127 B1 * | 10/2013 | Agrawal ................ G06F 21/62 713/154 |
| 2003/0225763 A1 | 12/2003 | Guilak et al. |
| 2004/0098385 A1 | 5/2004 | Mayfield et al. |
| 2004/0254904 A1 * | 12/2004 | Nelken ................ G06N 5/022 706/50 |
| 2005/0060643 A1 | 3/2005 | Glass et al. |
| 2006/0088894 A1 * | 4/2006 | Wright ............ G01N 33/57434 435/7.23 |
| 2008/0147790 A1 * | 6/2008 | Malaney ................ G06Q 10/00 709/203 |

OTHER PUBLICATIONS

Hart, et al., "Text Classification for Data Loss Prevention", Retrieved at <<https://www.hpl.hp.com/techreports/2011/HPL-2011-114.pdf>>, Aug. 6, 2011, pp. 21.

Non-Final Office Action for U.S. Appl. No. 13/527,267 Mailed Jun. 25, 2014.

\* cited by examiner

DETERMINING DOCUMENT CLASSIFICATION PROBABILISTICALLY THROUGH CLASSIFICATION RULE ANALYSIS

CROSS-REFERENCE TO RELATED APPLICATION

This Application is a continuation under 35 U.S.C. §120 of co-pending U.S. patent application Ser. No. 13/527,267 filed on Jun. 16, 2012, by the same inventors, commonly assigned herewith. The disclosure of the U.S. Patent Application is hereby incorporated by reference in its entirety.

BACKGROUND

Enterprises are under variety of business rules for document management and retention. Vast transactions accumulate great amounts of documents in modern business environments. Documents are usually kept in document management systems. Document management systems apply multitude of business rules to maintain documents in order to comply with the business requirements. Privacy rules are applied across organizations and their documents. Document retention rules are applied to comply with company policies and legal responsibilities. Accounting analysis systems are integrated to the document management solutions to analyze transaction processes. In addition, marketing solutions may be integrated to document management systems to extract customer and business information.

Document classification is at the core of data loss prevention (DLP) technologies. In diverse environments, business rules require entities to secure their document systems. In sensitive environments, identification of whether a document contains sensitive information may be needed in order to take an action to secure it (e.g. encrypt, audit or delete). Modern document classification approaches attempt to solve three key issues: false positive rates, false negative rates, and optimization. Modern optimization techniques utilize solutions based on testing or customer feedback. Existing solutions rely on "weight based" systems for document classification. Weight based systems are accumulative in nature and cannot be easily optimized over time.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to determining document classification probabilistically through classification rule analysis. According to some embodiments, an application may identify patterns and evidences within content of representative documents. The application may construct a classification rule based on an entity determined according to an analysis of the patterns and an affinity determined according to an analysis of the evidences. Next, the application may process the content with the classification rule to collect returned results. The returned results may be compared to expected results to evaluate the classification rule against acceptance requirements. Upon a successful determination, the application may identify confidence levels for the patterns and the evidences. Subsequent to an unsuccessful determination, the application may edit the classification rule and restart the rule evaluation process with the representative documents.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
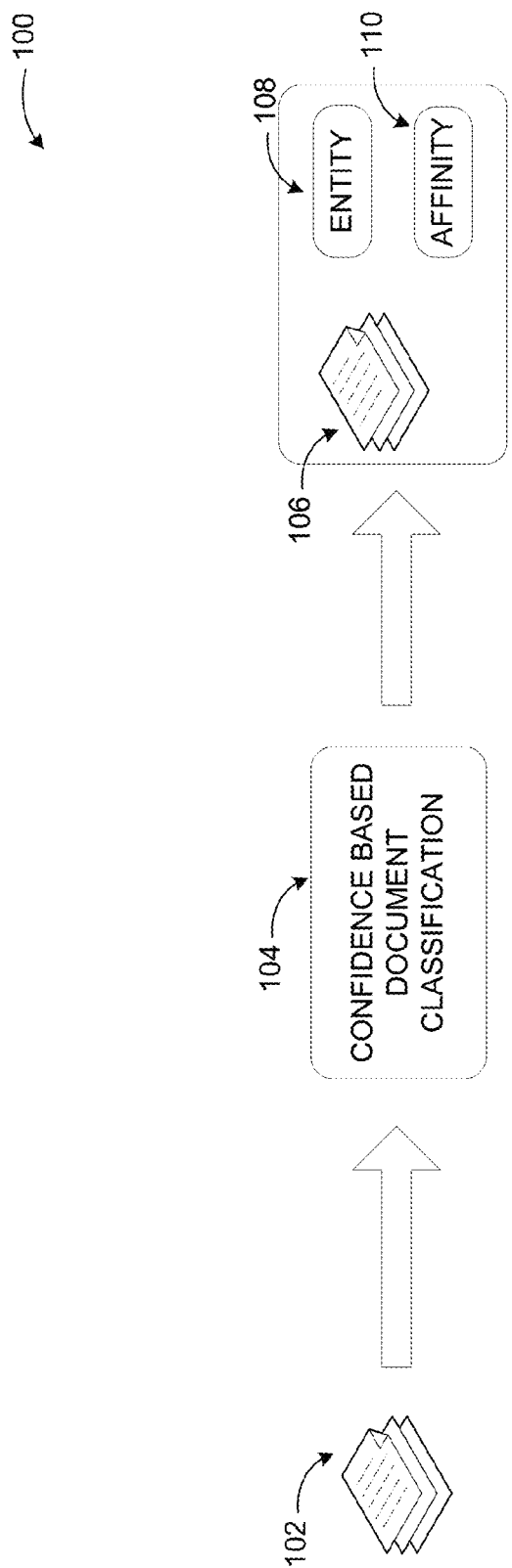
FIG. 1 illustrates an example component diagram, where an application may determine document classification probabilistically through classification rule analysis according to some embodiments.

As briefly described above, an application may determine document classification probabilistically through classification rule analysis. The application may identify patterns and evidences within content of representative documents. Representative documents may have key words that may be used to calibrate a classification algorithm within the application. The application may construct a classification rule based on an entity determined according to an analysis of the patterns and an affinity determined according to an analysis of the evidences. Next, the application may process the content with the classification rule to collect returned results. The returned results may indicate presence of patterns and evidences in the content. Subsequently, the application may compare the returned results to expected results to evaluate the classification rule against acceptance requirements. The acceptance requirements may have precision and recall thresholds for the entity and the affinity. Subsequent to a positive acceptance criterion, the application may identify confidence levels for the patterns and evidences to classify the content. Alternatively, the application may edit the classification rule and restart the classification rule evaluation subsequent to a negative acceptance criteria determination.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

According to some embodiments, a touch- or gesture-enabled input device and display screen may be utilized for determining document classification probabilistically through classification rule analysis. The gesture-enabled input device and display screen may utilize any technology that allows touch input or optically captured gestures by a user to be recognized. For example, some technologies may include, but are not limited to: heat, finger pressure, high capture rate cameras, infrared light, optic capture, tuned electromagnetic induction, ultrasonic receivers, transducer microphones, laser rangefinders, shadow capture, and the like.

According to embodiments, document classification may be a process of detecting predefined content characteristics for further processing. Document classification rules may be a set of instructions to configure a document classification algorithm. The classification algorithm may be a standalone application, part of it, or may be an application programming interface (API). The classification rules may define content characteristics. An example may be rules for finding a social security number (SSN). An entity may be a content analysis rule targeted towards identifiers (e.g.: SSN). An entity may be represented by a collection of countable patterns. A pattern may be defined as a collection of identifier matches. A pattern may occur within a proximity (e.g.: a range of 300 characters). An example entity may be a driver's license.

According to other embodiments, the application may utilize an affinity to construct the document classification rules. An affinity may be a content analysis rule targeted towards a type of document. An example may be a corporate financials document. The Affinity may be represented as a collection of evidences. An evidence may be an aggregate of matches with a certain proximity. An example affinity may be Sarbanes-Oxley corporate accounting attributes. In addition, the application may utilize confidence levels in determining document classification. An example confidence level may be a probability for an entity to be present if a pattern is found within the content. Another example confidence level may be a probability for an affinity to be present if an evidence is found within the content.

Throughout this specification, the term "platform" may be a combination of software and hardware components for determining document classification probabilistically through classification rule analysis. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 illustrates an example component diagram, where an application may determine document classification probabilistically through classification rule analysis according to some embodiments. The components and environments shown in diagram 100 are for illustration purposes. Embodiments may be implemented in various local, networked, cloud-based and similar computing environments employing a variety of computing devices and systems, hardware and software.

In an example environment illustrated in diagram 100, documents 102 may be classified by a confidence based document classification application 104. The application may classify documents by processing the content of the documents according to a classification rule. The application may attach an entity 108 value and an affinity 110 value to the processed content 106. Entity 108 and Affinity 110 values may be used to classify the document according to the matched characteristics.

According to some embodiments, the application combines several text processing techniques in a probabilistic manner to produce a confidence level for a document's classification. Each text processing component (e.g.: regular expressions, or keywords) may be assigned a probability of correctly matching an identifier. A set of probabilities may be combined using standard probabilistic arithmetic to yield an overall confidence level of the document containing an entity (e.g.: credit cards). The confidence level may be used with a threshold to inform an action to take. In an example scenario, an application may encrypt credit card numbers upon determining a high confidence level that the document has credit card numbers. Alternatively, the application may warn a user that the document may contain credit card numbers subsequent to detecting a moderate confidence level that the document has credit card numbers. Upon detecting a low confidence level for credit card numbers within the document, the application may not take any action.

Figure 2:
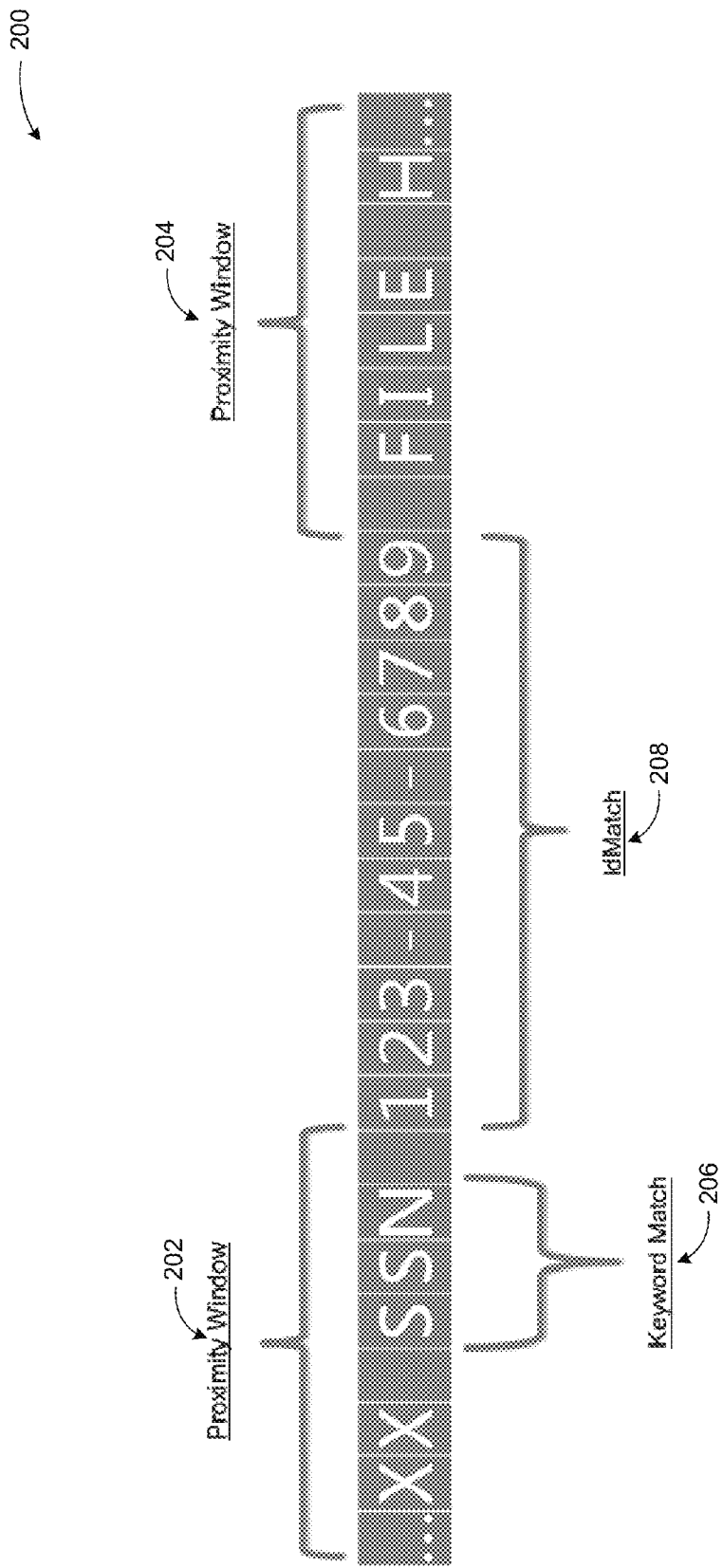
FIG. 2 illustrates an example entity evaluation in determining document classification probabilistically through classification rule analysis according to embodiments.

FIG. 2 illustrates an example entity evaluation in determining document classification probabilistically through classification rule analysis according to embodiments. Diagram 200 displays content of a document to be processed for classification. The application may be configured to recognize keywords and regulation expressions (regex) within proximity windows. The application may recognize a pattern 206 as a keyword match within proximity window 202. Alternatively, the application may be configured to recognize regex adjacent or within a predefined distance to a proximity window. The application may recognize another pattern 208 adjacent to proximity window 204.

According to some embodiments, a pattern may represent a collection of text markers (e.g.: regular expressions, keywords, and post-processing) with a probability to find an entity (e.g.: credit card). In an example scenario, a pattern for a social security number (SSN) may be: a regex matching a formatted SSN. The pattern may also meet range requirements such as number of characters. An example pattern match may include rules for: a keyword match (e.g.: Social Security, Soc Sec, SSN, SSNS, SSN#, SS#, and SSID), text representing a US address, text representing a date, text representing a name, etc.

According to other embodiments, an entity may be a collection of patterns. In an example scenario, there may be multiple ways to find an entity such as a credit card. Each pattern may be a different approach to finding the credit card. An entity may include a count and the confidence level of a match. An entity count may be equal the sum of all detected pattern counts. In an example scenario, $Count_{Entity}=Count_1+Count_2$ where $Count_1$ is the count of $Pattern_1$ and $Count_2$ is the count of $Pattern_2$. In addition, an entity confidence level may equal the combination of all matched patterns' confidence level. In example scenario, $P(Entity)=1-\Pi_{i=1}^{n}(1-P(Pattern_i))$. If $Pattern_1$ and $Pattern_2$ are matched then $CL_{Entity}=1-(1-CL_{Pattern1})\times(1-CL_{Pattern2})$ where CL is confidence level for respective entity or pattern.

Figure 3:
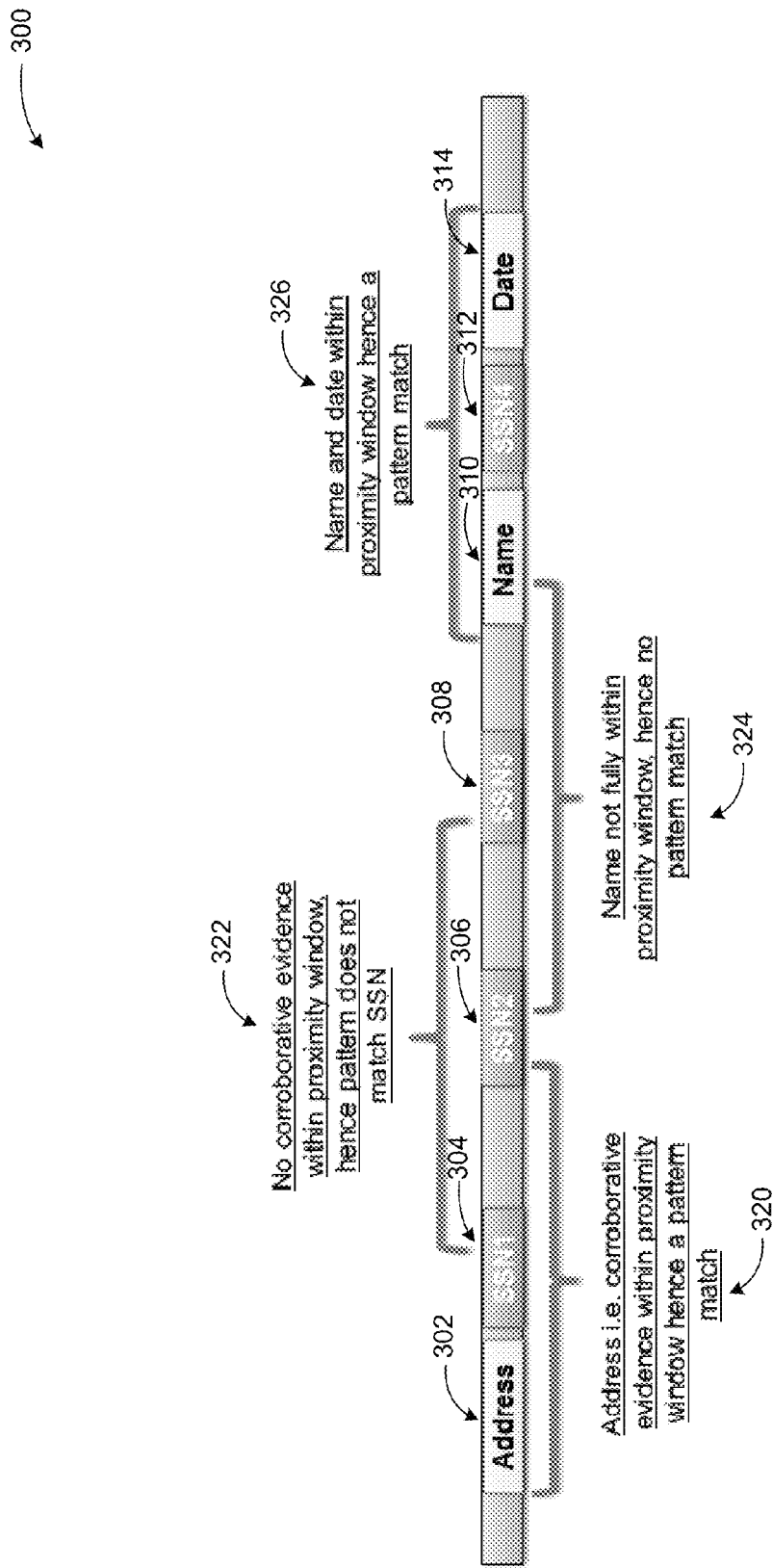
FIG. 3 illustrates a detailed example entity evaluation in determining document classification probabilistically through classification rule analysis according to embodiments.

FIG. 3 illustrates a detailed example entity evaluation in determining document classification probabilistically through classification rule analysis according to embodiments. Diagram 300 displays content with matched patterns. Corroborative evidence 302 may enable a pattern 304 within a proximity window 320 to the evidence 302 to be matched. Alternatively, a pattern 306 outside a proximity window 322 to an evidence may not be matched. In another example, pattern 308 may not be fully within a proximity window 324 to any evidence. As a result, the pattern 308 may not be matched. In another example, pattern 312 may be within proximity window 326 to evidence 310 and 314. As a result, the pattern 312 may be matched.

According to some embodiments, a pattern confidence level may be an evaluation of the entity's presence in the content. The pattern confidence level may be evaluated as the probability of matching at least one of the patterns indicating the entity's presence. In an example scenario:

$$p = 1 - \prod_{i=1}^{n}(1-p_i)^{v_i}$$

where p may be confidence level that the entity is present. $P_i$ may be confidence level of a pattern "i". $V_i$ may be 1, if one or more instances of the pattern "i" are found in the content, and 0 otherwise. N may be number of patterns compounding the entity.

Figure 4:
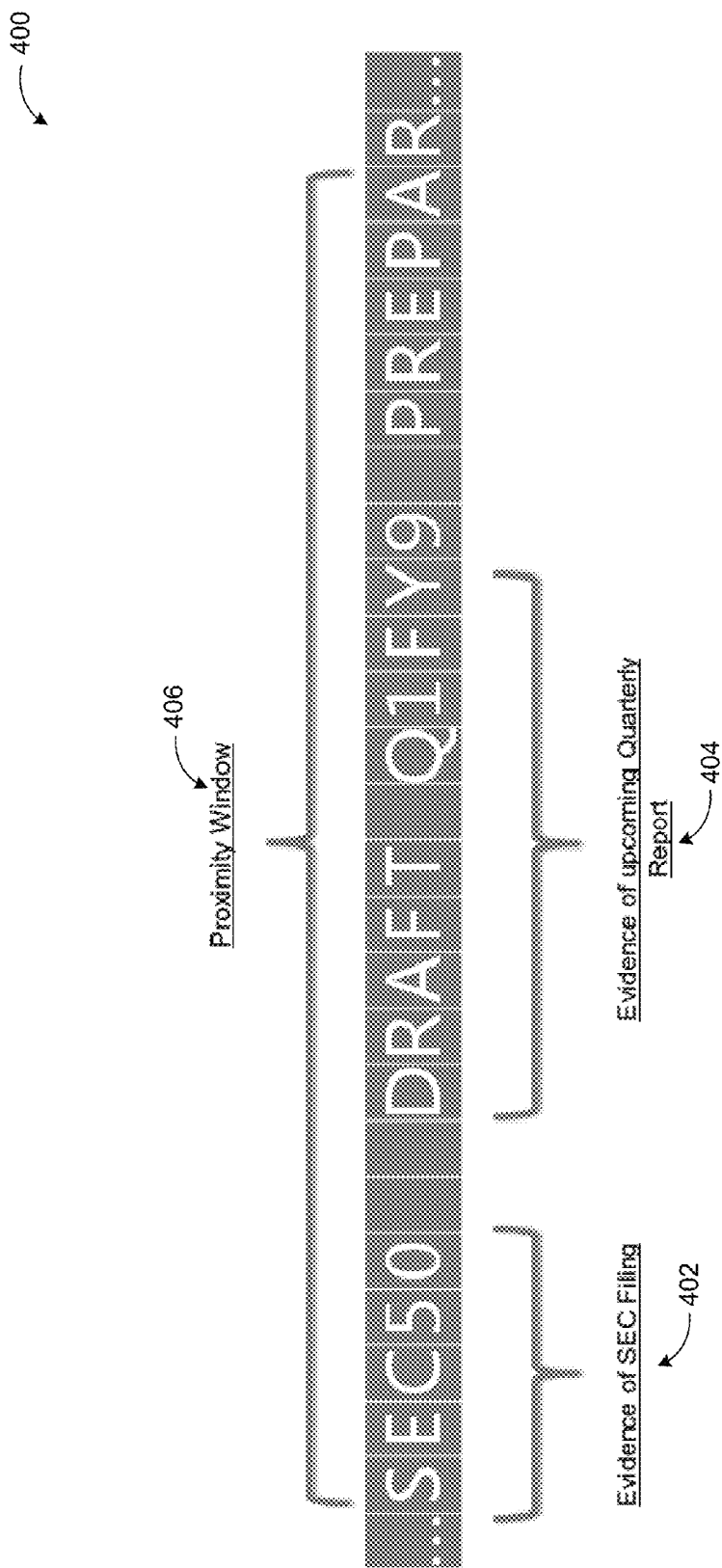
FIG. 4 illustrates an example affinity evaluation in determining document classification probabilistically through classification rule analysis according to embodiments.

FIG. 4 illustrates an example affinity evaluation in determining document classification probabilistically through classification rule analysis according to embodiments. Diagram 400 may display a sample content with evidences making up an affinity for the document. The content may be analyzed by the application according to a proximity window 406. The application may locate two evidences 402 and 404 within the proximity window 406. In an example scenario, the content may be accounting related and may contain securities exchange commission (SEC) reports and quarterly report evidences.

According to some embodiments, an affinity may be a collection of evidences. Affinity may be targeted towards rules without well-defined text. Affinity evaluation may provide evidence presence and confidence level information. Affinity evaluation may not return a count. In an example scenario, corporate financials analysis or Sarbanes Oxley (SARBOX) may have no clear identifier. SARBOX information may be a collection of evidence indicating a confidential financial file. In another example scenario health insurance portability and accountability act (HIPAA) information may have no consistent identifiers. HIPAA information may require a collection of evidence to indicate if HIPAA applies to a document.

According to other embodiments, an evidence may represent a collection of text markers (e.g.: regular expressions, keywords and post-processing) that have a probability to find a particular target entity (e.g. credit card). Evidence may be similar to a pattern. In an example scenario, a document may contain corporate financials if the confidence level is greater than 65%. The confidence level may be determined by increasing the confidence level by 60% if a regex indicates a most recent quarter, or terms indicating presence of a confidential document. Alternatively, the confidence level may be determined by increasing the confidence level by 40% subsequent to finding terms for assets and liabilities, or terms for a balance sheet, or terms for a profit and loss (P&L) statement. In another example, the confidence level may be found by increasing the confidence level by 40% subsequent to finding two terms including tax filing, dollar amounts, SEC reports, filing/schedules, or dollar totals.

Figure 5:
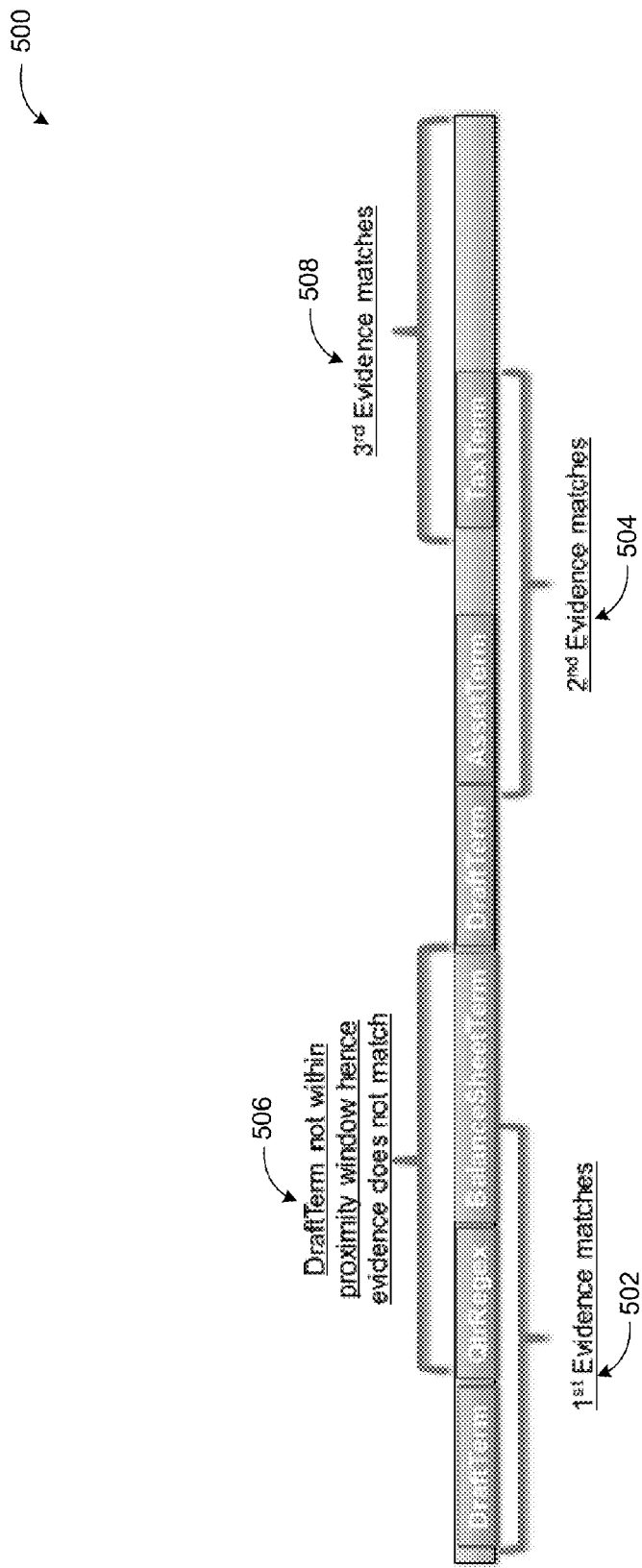
FIG. 5 illustrates a detailed example affinity evaluation in determining document classification probabilistically through classification rule analysis according to embodiments.

FIG. 5 illustrates a detailed example affinity evaluation in determining document classification probabilistically through classification rule analysis according to embodiments. Diagram 500 displays evidence location through content analysis. Proximity window 502 encompasses evidence matches. Alternatively, terms within range 506 are outside the proximity window therefore do not match as evidences. Additionally, terms within proximity windows 504 and 508 match as evidences.

According to embodiments, the application may scan within a window of content (width=proximity). The application may evaluate an affinity confidence level for each window position subsequent to finding affinity. The affinity confidence level may be evaluated as a probability of at least one of the evidences being within the proximity window. The probability may indicate the affinity's presence. In an example scenario:

$$p = 1 - \prod_{i=1}^{n}(1-p_i)^{v_i}$$

where p may be confidence level that the affinity is present. $P_i$ may be confidence level of an evidence "i". $V_i$ may be 1, if one or more instances of the evidence "i" are found in the content, and 0 otherwise. N may be number of evidences compounding the affinity.

Figure 6:
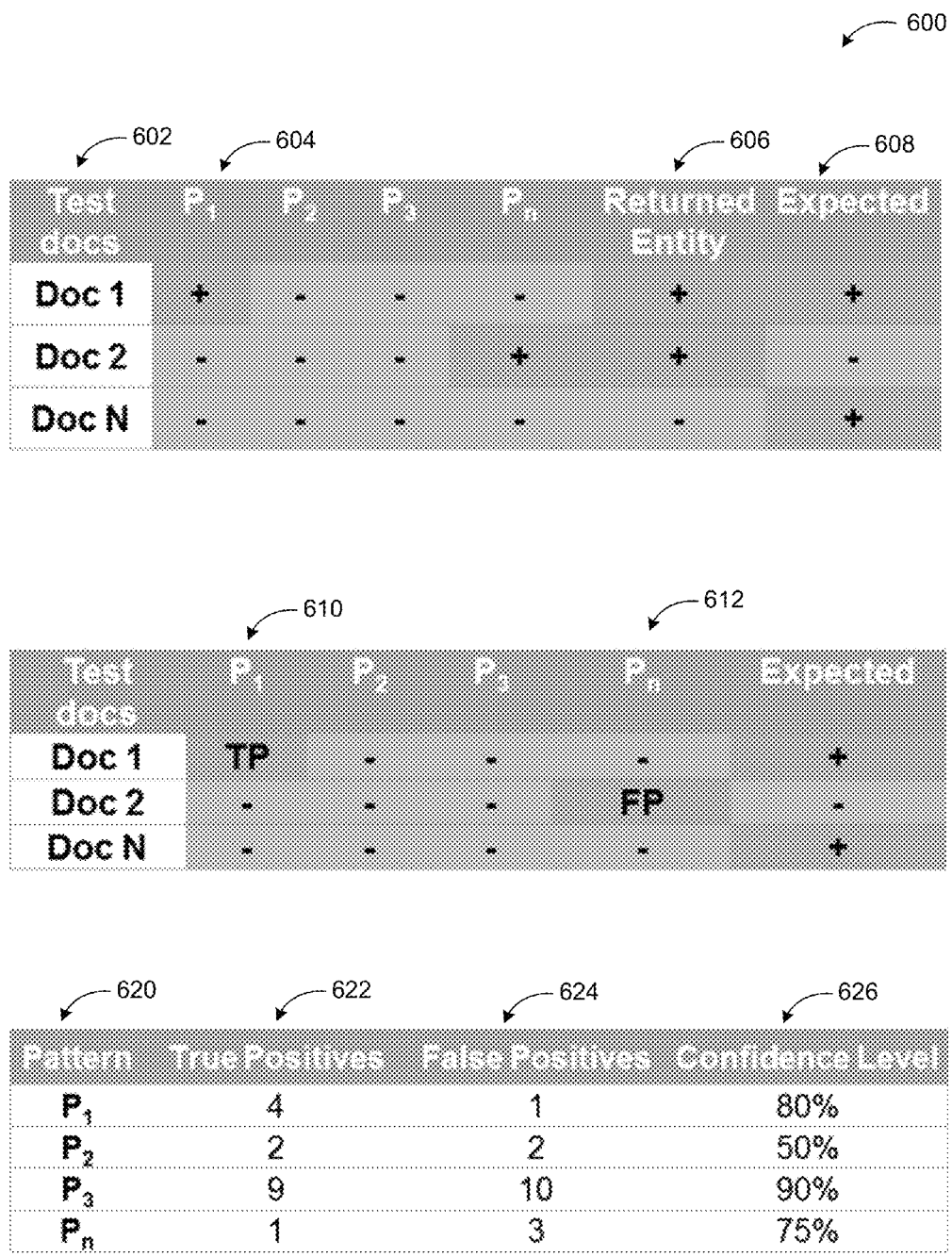
FIG. 6 illustrates a rule optimizing example in determining document classification probabilistically through classification rule analysis according to embodiments.

FIG. 6 illustrates a rule optimizing example in determining document classification probabilistically through classification rule analysis according to embodiments. Diagram 600 displays multiple tables displaying various stages of entity and affinity evaluations. In an example scenario, column 602 contains document names. Column 604 includes results of matching a pattern within the document. Columns 606 and 608 include entity results (subsequent to document analysis) and expected results, respectively.

According to an embodiment, the application (or a user) may prepare a set of documents representative of an environment. The application (or a user) may find patterns or evidences indicating the entity and the affinity. The application may construct a rule based on the patterns and evidences that expected to capture the information in the documents. The application may process the rule against the content of the documents and collect accuracy data. The application may compare the returned and expected results for the content. If the entity and affinity rules meet acceptance requirements (including predetermined precision and recall rates for established thresholds), the rule may be ready for processing against other documents. If the rule does not meet acceptance requirements, the application or a user may edit the rule by adding more corroborative evidence, removing/adding additional patterns evidences, etc. The application or user may restart process to evaluate the classification rule subsequent to editing.

Columns 610 and 612 contains true positive (TP) and false positive (FP) indicators for evaluated patterns. The application may mark the patterns and evidences as TP and FP according to the evaluation. In an example scenario, column 620 contains pattern names, column 622 contains TP count, column 624 contains FP count, and column 626 contains confidence level calculation. The application may set confidence level for each pattern and evidence as its number of TP divided by sum of number of TP and number of FP.

According to some embodiments, an application or a user may prepare a set of representative documents for an environment (e.g.: corporate finance department). For each entity, the application may evaluate the values of:

$$\mathbb{P}_E = \frac{|(\bigcup P_i) \cap E|}{|E|}, \mathbb{R}_E = \frac{|(\bigcup P_i) \cap E|}{|\bigcup P_i|},$$

where $P_i$ is a subset of representative documents where pattern $p_i$ is detected. E is a subset of representative documents where the entity may be present. The entity may be accepted if the environment $\mathbb{P}_E$ is greater or equal to the minimal level of precision established by the application or the user for the entity, and $\mathbb{R}_E$ is greater or equal the minimal level of recall established by the application or the user for the entity. Else, the entity's patterns' math logic may need to be updated. Confidence level for each pattern may be evaluated as $$CL_i = \frac{|P_i \cap E|}{|E|}$$

for the accepted entity.

According to other embodiments, the application may evaluate, for each affinity, the values of:

$$\mathbb{P}_A = \frac{|(\bigcup E_i) \cap A|}{|A|}, \mathbb{R}_A = \frac{|(\bigcup E_i) \cap A|}{|\bigcup E_i|},$$

where $E_i$=subset of representative documents where evidence $e_i$ may be detected and A=subset of representative documents where affinity may be actually present. The affinity may be accepted if for the environment $\mathbb{P}_A$ is greater or equal to the minimal level of precision established by the application or the user for the affinity, and $\mathbb{R}_A$ is greater or equal the minimal level of recall established by the user or the application for the affinity. Else, the affinity's evidences' math logic may need to be updated. Confidence level for each evidence may be evaluated as $$CL_i = \frac{|E_i \cap A|}{|A|}$$

for the accepted affinity.

The example scenarios and schemas in FIG. 2 through 6 are shown with specific components, data types, and configurations. Embodiments are not limited to systems according to these example configurations. Determining document classification probabilistically through classification rule may be implemented in configurations employing fewer or additional components in applications and user interfaces. Furthermore, the example schema and components shown in FIG. 2 through 6 and their subcomponents may be implemented in a similar manner with other values using the principles described herein.

Figure 7:
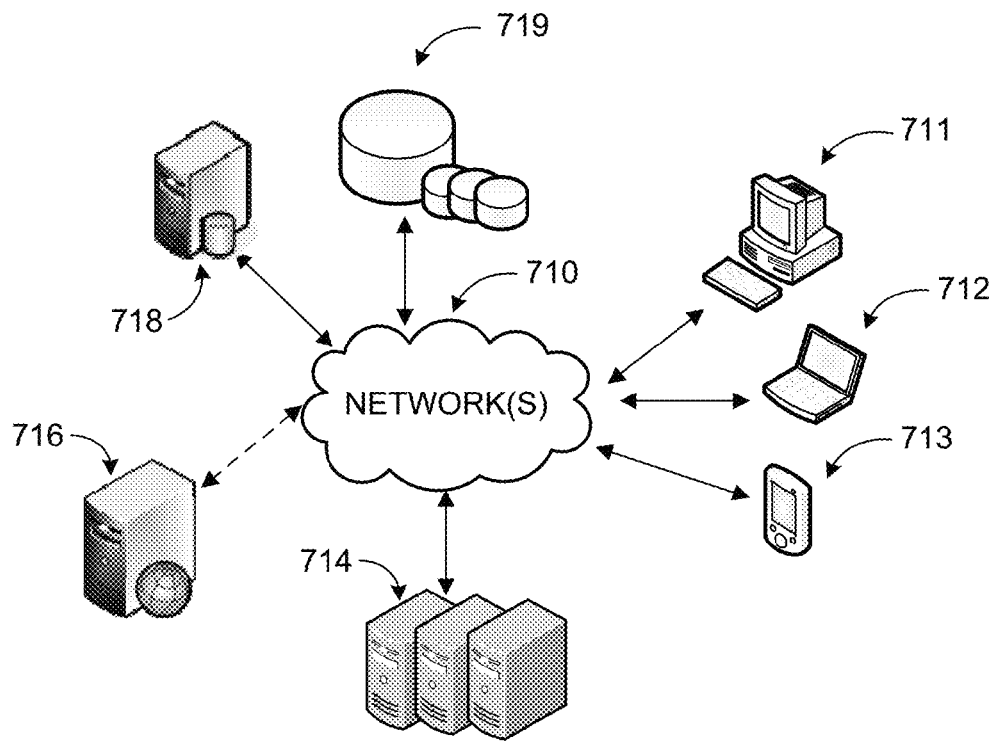
FIG. 7 is a networked environment, where a system according to embodiments may be implemented.

FIG. 7 is a networked environment, where a system according to embodiments may be implemented. Local and remote resources may be provided by one or more servers 714 or a single server (e.g. web server) 716 such as a hosted service. An application may communicate with client interfaces on individual computing devices such as a smart phone 713, a laptop computer 712, or desktop computer 711 ('client devices') through network(s) 710.

As discussed above, an application may determine document classification probabilistically through classification rule analysis. An entity rule may be evaluated from an analysis of a collection of patterns. An affinity rule may be evaluated from an analysis of a collection of evidences. The entity and affinity rules may be used to process documents and compare against predetermined thresholds for rule assessment. Client devices 711-713 may enable access to applications executed on remote server(s) (e.g. one of servers 714) as discussed previously. The server(s) may retrieve or store relevant data from/to data store(s) 719 directly or through database server 718.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also coordinate communication over other networks such as Public Switched Telephone Network (PSTN) or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed to determine document classification probabilistically through classification rule analysis. Furthermore, the networked environments discussed in FIG. 7 are for illustration purposes only. Embodiments are not limited to the example applications, modules, or processes.

Figure 8:
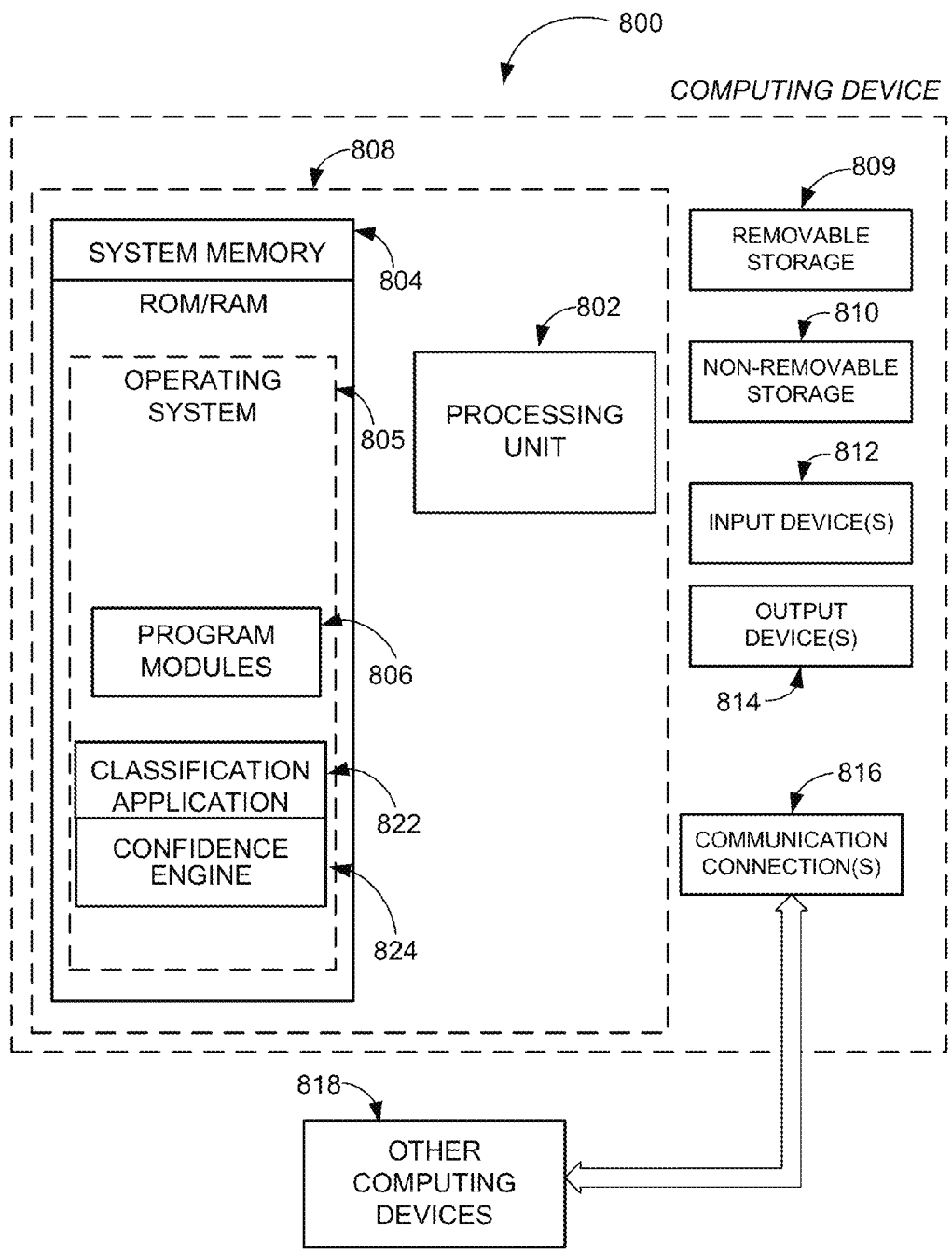
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, classification application 822, and confidence algorithm 824.

Classification application 822 may assess classification rules based on analysis results according to embodiments. The confidence algorithm 824 may produce entity and affinity confidence levels. The confidence algorithm 824 may scan and recognize patterns and evidences within the content of documents. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that execute communication applications, storage servers, and comparable devices. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 9:
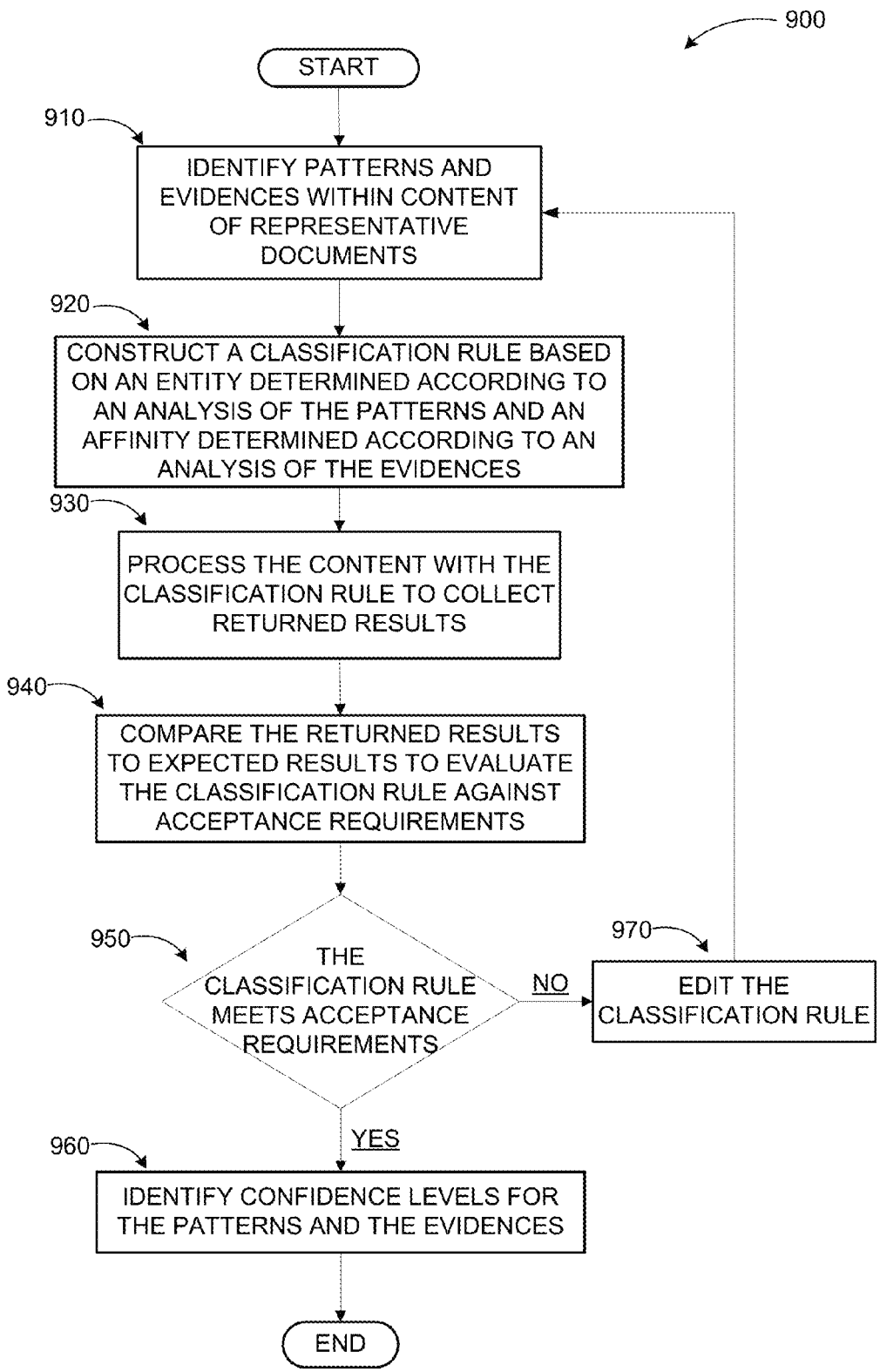
FIG. 9 illustrates a logic flow diagram for a process determining document classification probabilistically through classification rule analysis according to embodiments.

FIG. 9 illustrates a logic flow diagram for a process determining document classification probabilistically through classification rule analysis according to embodiments. Process 900 may be implemented by a classification application in some examples.

Process 900 may begin with operation 910 where an application may identify patterns and evidences within content of representative documents. A user may define identifiers to match patterns and parameters such as proximity windows within which to match evidences. At operation 920, the application may construct a classification rule based on an entity determined according to an analysis of the patterns and an affinity determined according to an analysis of the evidences. Subsequently, the application may process the content of the documents with the classification rule to collect returned results at operation 930. Next, the application may compare the returned results to predetermined expected results to evaluate the classification rule against acceptance requirements at operation 940. At decision node 950, the application may evaluate whether the classification rule meets acceptance requirements such as precision, recall, and their respective thresholds. Subsequent to a positive determination, the application may identify confidence levels for patterns and evidences at operation 960. However, upon a negative evaluation of meeting the acceptance requirements, the application may edit the classification rule and restart the rule evaluation process at operation 970.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 900 are for illustration purposes. Determining document classification probabilistically through classification rule analysis according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A system for determining document classification probabilistically through classification rule analysis, the system comprising:
   at least one server comprising:
   a memory configured to store instructions; and
   a processor configured to execute an application in conjunction with the instructions stored in the memory, wherein the application is configured to:
   identify patterns and evidences within content of representative documents;
   construct a classification rule based on an entity determined according to an analysis of the patterns and an affinity determined according to an analysis of the evidences; and
   process the content with the classification rule to:
   determine an entity count and an entity confidence level for the entity;
   determine an affinity presence and an affinity confidence level for the affinity, wherein the affinity confidence level is determined from a probability of at least one of the evidences being within a proximity window of a presence of the affinity, and the proximity window includes a window of the content used to scan the content for the affinity;
   aggregate the entity count, the entity confidence level, the affinity presence, and the affinity confidence level to returned results;
   compare the returned results to expected results to evaluate the classification rule against acceptance requirements; and
   in response to a determination that the classification rule meets the acceptance requirements, identify confidence levels for the patterns and the evidences; else
   edit the classification rule.

2. The system of claim 1, wherein the application is further configured to:
   in response to a determination that an entity rule meets acceptance requirements, process the entity rule against another document, wherein the acceptance requirements include precision requirements for established thresholds and recall rates for established thresholds.

3. The system of claim 1, wherein the application is further configured to:
   in response to a determination that an affinity rule meets acceptance requirements, process the affinity rule against another document, wherein the acceptance requirements include precision requirements for established thresholds and recall rates for established thresholds.

4. The system of claim 1, wherein the application is further configured to:
   in response to a determination that an entity rule fails to meet one or more of precision requirements for established thresholds and recall rates for established thresholds, one or more of: edit the entity rule by adding corroborative evidence, edit the entity rule by removing pattern evidence, and edit the entity rule by adding pattern evidence.

5. The system of claim 4, wherein the application is further configured to:
   reprocess the edited entity rule.

6. The system of claim 1, wherein the application is further configured to:
   in response to a determination that an affinity rule fails to meet one or more precision requirements for established thresholds and recall rates for established thresholds, one or more of: edit the affinity rule by adding corroborative evidence, edit the affinity rule by removing pattern evidence, and edit the affinity rule by adding pattern evidence.

7. The system of claim 6, wherein the application is further configured to:
   reprocess the edited affinity rule.

8. A computing device for determining document classification probabilistically through classification rule analysis, the computing device comprising:
   a memory configured to store instructions; and
   a processor coupled to the memory, the processor executing an application in conjunction with the instructions stored in the memory, wherein the application is configured to:
   identify patterns and evidences within content of documents;
   determine a confidence level of an affinity from a probability of at least one of the evidences being within a proximity window of a presence of the affinity, wherein the proximity window includes a window of the content used to scan the content for the affinity;
   construct a classification rule based on an entity determined according to an analysis of the patterns and the affinity determined according to an analysis of the evidences;
   define the entity through the patterns, wherein each pattern is a collection of text markers with a probability of finding the entity including one or more of: a regular expression match and a keyword match;
   process the content with the classification rule to collect returned results; and
   compare the returned results to expected results to evaluate the classification rule against acceptance requirements.

9. The computing device of claim 8, wherein the application is further configured to:
   accept the entity subsequent to determining an entity environment value of the entity equal or greater than an entity precision value of the entity and an entity recall value of the entity equal or greater than the entity recall value.

10. The computing device of claim 8, wherein the application is further configured to:
    accept the affinity subsequent to determining an affinity environment value of the affinity equal or greater than an affinity precision value of the affinity and an affinity recall value of the affinity equal or greater than the affinity recall value.

11. The computing device of claim 8, wherein the application is further configured to:
evaluate the classification rule to determine if the classification rule meets acceptance requirements, wherein the acceptance requirements include precision thresholds and recall thresholds.

12. The computing device of claim 11, wherein the application is further configured to:
in response to a positive evaluation of the acceptance requirements, identify confidence levels for the patterns and the evidences; and
in response to a negative determination of the acceptance requirements, edit the classification rule and reevaluate the classification rule against acceptance requirements.

13. A method executed on a computing device for determining document classification probabilistically through classification rule analysis, the method comprising:
identifying patterns and evidences within content of documents, wherein each one of the evidences includes an aggregate of keyword matches that are in proximity;
determining a confidence level of an affinity from a probability of at least one of the evidences being within a proximity window of a presence of the affinity, wherein the proximity window includes a window of the content used to scan the content for the affinity;
constructing a classification rule based on an entity determined according to an analysis of the patterns and the affinity determined according to an analysis of the evidences;
processing the content with the classification rule to collect returned results; and
comparing the returned results to expected results to evaluate the classification rule against acceptance requirements.

14. The method of claim 13, further comprising:
defining the entity through the patterns, wherein each pattern is a collection of text markers with a probability of finding the entity including one or more of: a regular expression match and a keyword match.

15. The method of claim 13, further comprising:
determining a confidence level of the entity from a probability of matching at least one of the patterns to indicate a presence of the entity.

16. The method of claim 15, further comprising:
in response to a detection of the entity within the document having the confidence level as a moderate confidence level, warning a user that the document includes the entity.

17. The method of claim 15, further comprising:
in response to a detection of the entity within the document having the confidence level as a high confidence level, encrypting the entity.

18. The method of claim 13, further comprising:
determining a confidence level of the entity and a confidence level of the affinity as a number of true positives divided by a sum of a number of true positives and a number of false positives.

19. The method of claim 13, further comprising:
calibrating the classification rule with keywords of the content.

* * * * *